(12) United States Patent
Hirabayashi

(10) Patent No.: US 10,890,682 B2
(45) Date of Patent: Jan. 12, 2021

(54) METHOD AND SYSTEM FOR IMAGING DIPPING STRUCTURES

(71) Applicant: Schlumberger Technology Corporation, Sugar Land, TX (US)

(72) Inventor: Nobuyasu Hirabayashi, Yokohama (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 79 days.

(21) Appl. No.: 15/752,945

(22) PCT Filed: Sep. 6, 2016

(86) PCT No.: PCT/US2016/050446
§ 371 (c)(1),
(2) Date: Feb. 15, 2018

(87) PCT Pub. No.: WO2017/044431
PCT Pub. Date: Mar. 16, 2017

(65) Prior Publication Data
US 2018/0246243 A1    Aug. 30, 2018

Related U.S. Application Data

(60) Provisional application No. 62/215,153, filed on Sep. 7, 2015.

(51) Int. Cl.
*G01V 1/50* (2006.01)
*G01V 1/46* (2006.01)
(Continued)

(52) U.S. Cl.
CPC ............... *G01V 1/50* (2013.01); *G01V 1/301* (2013.01); *G01V 1/42* (2013.01); *G01V 1/46* (2013.01);
(Continued)

(58) Field of Classification Search
CPC . G01V 1/301; G01V 1/42; G01V 1/50; G01V 1/46; G01V 2210/64;
(Continued)

(56) References Cited

U.S. PATENT DOCUMENTS 4,543,648 A * 9/1985 Hsu .................... G01V 1/44
367/29
4,736,347 A 4/1988 Goldberg et al.
(Continued)

OTHER PUBLICATIONS

Kito, T., and J. Korenaga, 2010, "Cross-correlation weighted migration: towards high-resolution mapping of mantle heterogeneities", Geophysical Journal International, 181, pp. 1109-1127.
(Continued)

*Primary Examiner* — Daniel L Murphy
(74) *Attorney, Agent, or Firm* — Eileen Pape

(57) ABSTRACT

A method for imaging one or more dipping structures is provided. The method comprises providing a given velocity model, calculating travel time of a seismic wave using the velocity model, estimating coherency of event signals of array data that are time-corrected for a trial reflector, weighting a waveform sample corresponding to the travel time based on the coherency, and mapping the weighted waveform sample.

20 Claims, 12 Drawing Sheets

(51) Int. Cl.
*G01V 1/42* (2006.01)
*G01V 1/30* (2006.01)

(52) U.S. Cl.
CPC .... *G01V 2200/16* (2013.01); *G01V 2210/121* (2013.01); *G01V 2210/1293* (2013.01); *G01V 2210/1295* (2013.01); *G01V 2210/1429* (2013.01); *G01V 2210/161* (2013.01); *G01V 2210/51* (2013.01); *G01V 2210/512* (2013.01); *G01V 2210/64* (2013.01)

(58) Field of Classification Search
CPC ..... G01V 2210/1295; G01V 2210/512; G01V 2210/51; G01V 2210/1293; G01V 2200/16; G01V 2210/161; G01V 2210/121; G01V 2210/1429
USPC ......................................................... 367/38
See application file for complete search history.

(56) References Cited

U.S. PATENT DOCUMENTS

| | | | |
|---|---|---|---|
| 6,308,137 | B1 | 10/2001 | Underhill et al. |
| 6,477,112 | B1 | 11/2002 | Tang et al. |
| 2005/0207278 | A1 | 9/2005 | Reshef et al. |
| 2007/0097788 | A1 | 5/2007 | Tang et al. |
| 2011/0255370 | A1 | 10/2011 | Hirabayashi et al. |
| 2011/0308811 | A1 | 12/2011 | Ghayour et al. |

OTHER PUBLICATIONS

Baggeroer, A. H., W. A. Kuperman, and P. N. Mikhalevsky, Oct. 1993, "An overview of matched field methods in ocean acoustics": IEEE Journal of Ocean Engineering, 18, No. 4 pp. 99-108.

Schoenberg, M., 1980, "Elastic wave behavior across linear slip interface": Journal of Acoustic Society of America, 68, pp. 1516-1521.

Hornby, B. E., Jun. 1989, "Imaging of near-borehole structure using full-waveform sonic data": Geophysics, 54, No. 6 pp. 747-757.

Myung, W. L., and A. H. Balch, Sep. 1982, "Theoretical seismic wave radiation from a fluid-filled borehole": Geophysics, 47, No. 9, pp. 1308-1314.

Haldorsen, J. B. U., Z. Fuping, N. Hirabayashi, W. H. Borland, H. Karniawan, H. Yamamoto, K. Al-Ghammari, and R. T. Coates, Jul. 2010, "Borehole acoustic reflection survey (BARS) using full waveform sonic data": First Break, 28, pp. 33-38.

Borcea, L., G. Papanicolaou, and C. Tsogka, 2003, Theory and applications of time reversal and interferometric imaging: Inverse Problems, 19, S139-S164.

Borcea, L., C. Tsogka, G. Papanicolaou, and J. Berryman, 2002, Imaging and time reversal in random media: Inverse Problems, 18, 1247-1279.

Klokov, A., S. Fomel, 2013, Selecting an Optimal Aperture in Kirchhoff migration using dip-angle images: Geophysics, 78, No. 6, S243-254.

Schneider, W. A., Oct. 1984, The common depth point stack: Proceedings of the IEEE, 72, No. 10, 1238-1257.

International Search Report and Written Opinion issued in the related PCT application PCT/US2016/050446, dated Dec. 19, 2016 (15 pages).

Beylkin, G., 1985, "Imaging of discontinuities in the inverse scattering problem by inversion of a causal generalized radon transform": Journal of Mathematical Physics, 26, 99-108.

Buske, S., R. Gutjahr, and C. Sick, 2009, "Fresnel volume migration of single-component seismic data": Geophysics, 74, No. 6, WCA47-WCA55.

International Preliminary Report on Patentability issued in the related PCT application PCT/US2016/050446, dated Mar. 13, 2018 (11 pages).

* cited by examiner

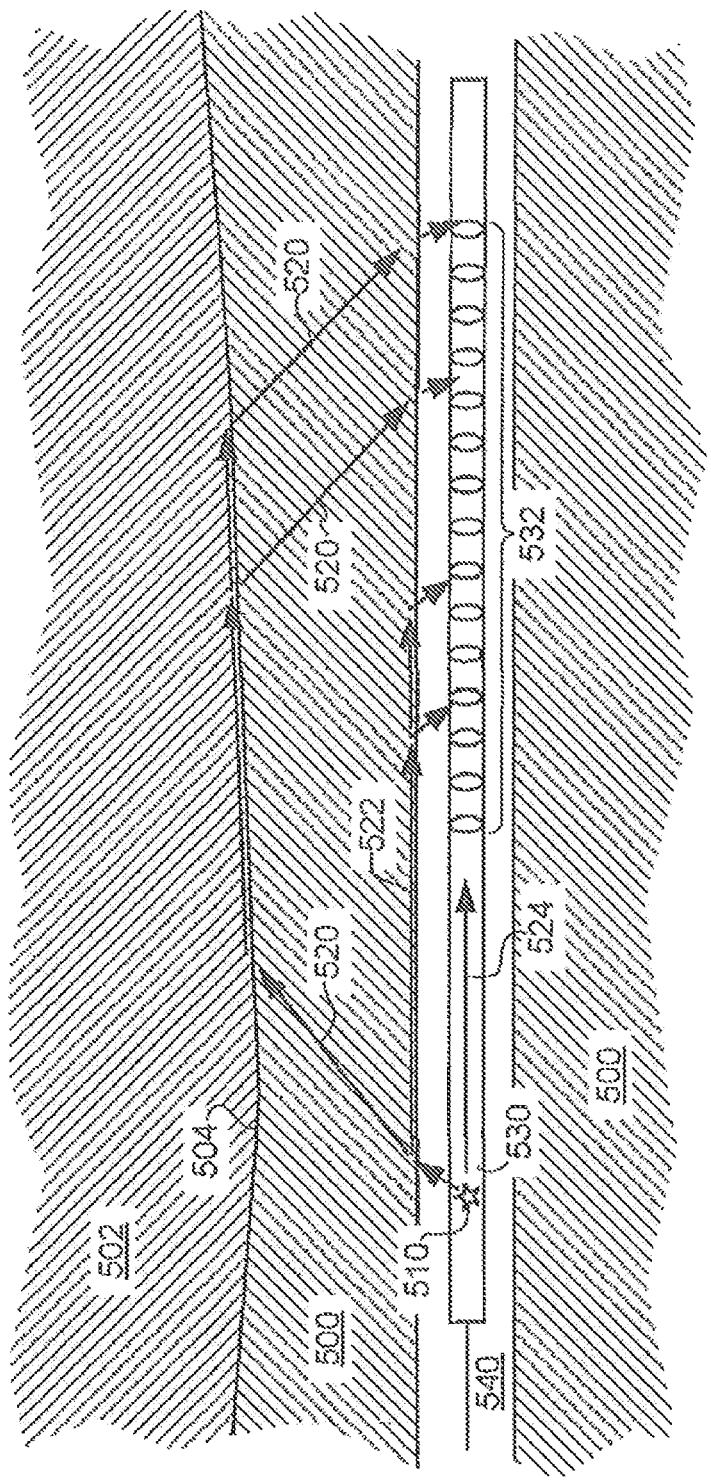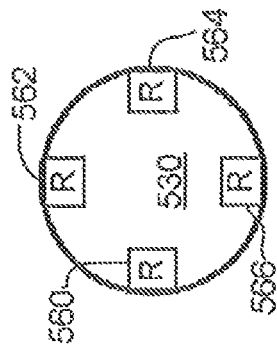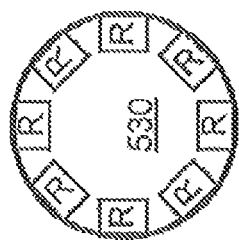
FIG. 6A
FIG. 6B
FIG. 6C

METHOD AND SYSTEM FOR IMAGING DIPPING STRUCTURES

CROSS-REFERENCE TO RELATED APPLICATIONS

This application is based upon and claims the benefit of the priority of U.S. Provisional Application Ser. No. 62/215,153 entitled "REFLECTOR IMAGING METHOD USING TRIAL REFLECTORS AND CROSS-CORRELATION" to Nobuyasu HIRABAYASHI filed on Sep. 7, 2015, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to methods and systems for imaging one or more subterranean structures such as dipping structures. In particular, the present disclosure relates to methods and systems to obtain a high-resolution image of one or more dipping structures such as fractures using seismic and sonic data in oil and gas industries.

To image subsurface structures using sonic data, Kirchhoff-type migration method is commonly used and it is well known that an aperture of migration needs to be optimized to obtain a high-resolution image of the subsurface structure. For optimizing the aperture, information on the structural dip is required and it is often not available. To obtain a high resolution image without having dip information, Kito and Korenaga developed a migration method for scattering waves to image core-mantle structures that uses cross-correlation and semblance, as described in the Kito, T., and J. Korenaga, 2010, "Cross-correlation weighted migration: towards high-resolution mapping of mantle heterogeneities", Geophysical Journal International, 181, pp. 1109-1127, the entire contents of which is hereby incorporated by reference herein.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosure, a method for imaging one or more dipping structures, the method comprises providing a given velocity model, calculating travel time of a seismic wave using the velocity model, estimating coherency of event signals that are time-corrected for a trial reflector, weighting a waveform sample corresponding to the travel time based on the coherency, and mapping the weighted waveform sample.

In another aspect of the present disclosure, a system for imaging one or more dipping structures comprises a memory to record seismic or sonic (i.e., acoustic) data and a processor. The processor is used to provide a given velocity model, calculate travel time of a seismic wave using the velocity model, estimate coherency of event signals that are time-corrected for a trial reflector, weight a waveform sample corresponding to the travel time based on the coherency, and map the weighted waveform sample.

In the method and system of the disclosure herein, the trial reflector may be configured for each image point and source-receiver pair so that a reflected ray becomes specular for the trial reflector at the image point. The trial reflector may be a planar reflector configured so that an isochronal vector of ray from a source and receiver to an image point is perpendicular to the trial reflector at the image point. The coherency may be estimated based on cross-correlation of waveform traces of the event signals. Herein, the minimum or median of coherency may be taken in a common shot gather or any subset of recorded data. The weighting may comprise converting the coherency to a weight function and calculating a mapping function based on the weight function and a function of the waveform samples.

The method of the disclosure herein may further comprise stacking the waveform samples on the trial reflector. The method may also further comprise removing a direct arrival from the seismic waves before calculating the travel time of the seismic waves. In the system of the disclosure herein, the processor may be further used to stack the waveform samples on the trial reflector and/or may be further used to remove a direct arrival from the seismic waves before calculating the travel time of the seismic waves. In the method and system of the disclosure herein, the dipping structure may include a fracture.

Advantages and novel features of the disclosures will be set forth in the description which follows or may be learned by those skilled in the art through reading the materials herein.

BRIEF DESCRIPTION OF THE DRAWINGS

Embodiments of a down-hole apparatus and components thereof according to the disclosures herein are described with reference to the following figures. The same numbers are used throughout the figures to reference like features and components.

FIG. 6A illustrates the down-hole measurement of refracted energy by a tool in a borehole;

FIGS. 6B and 6C are examples of cross-sections of the tool shown in FIG. 6A;

DETAILED DESCRIPTION

Figure 1A:
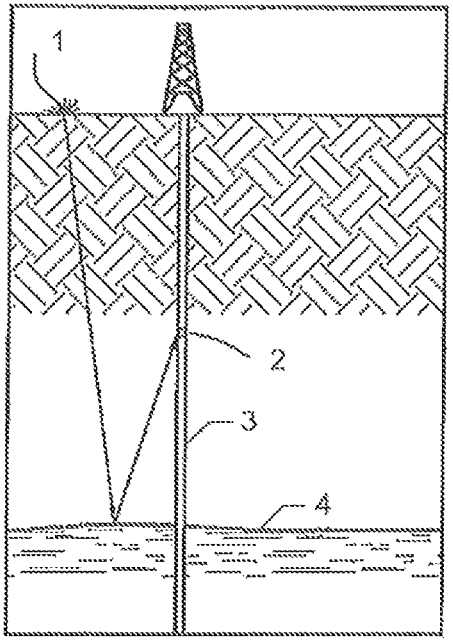
FIGS. 1A-1D show typical seismic-while-drilling tools with one or more transmitters located at the surface according to embodiments of the disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "down-hole" refers to a subterranean environment, particularly in a wellbore. "Down-hole tool" is used broadly to mean any tool used in a subterranean environment including, but not limited to, a logging tool, an imaging tool, an acoustic tool, a permanent monitoring tool, and a combination tool.

The signal processing systems and data processing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Various embodiments incorporating the methods and techniques of this disclosure follow an integrated approach using conventional sonic, ultrasonic and borehole seismic to enable various kinds of measurements such as an evaluation of borehole conditions.

Water, oil and gas are transported through fractures in subsurface or subterranean formations, resulting in the dissolution of certain types of rocks (e.g., limestone and carbonate). In geological terms, subsurface features such as fractures have a strike and a dip, which refer to the orientation or attitude of the feature. The strike of a bed, fault or other feature, including planar features, is a line representing the intersection of that feature with a horizontal plane. The dip is the angle of descent of the feature relative to the horizontal plane. Often, the dip is taken to be perpendicular to the strike. The dissolution process creates openings or caves, known as karst caves around intersections of fractures, and the karst features are expected to follow the dip of the formation due to the contrast solubility of the rocks.

The fractures or caves that appear in a subsurface formation reflect seismic waves differently than the solid rock features or layers surrounding the fractures or caves, as discussed in U.S. Pat. Application Publication No. 2011/0255370 A1, the contents of which are herein incorporated by reference in its entirety.

Figure 1B:
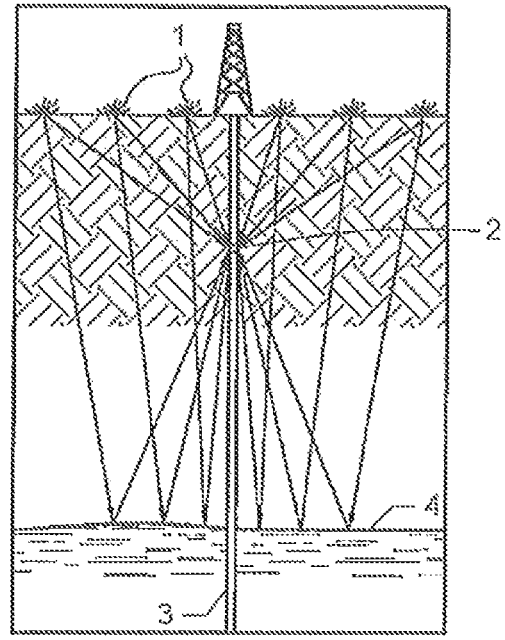
Figure 1C:
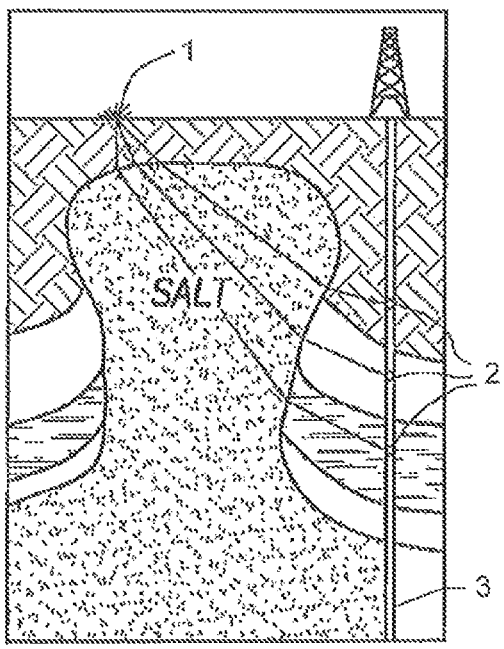
Figure 1D:
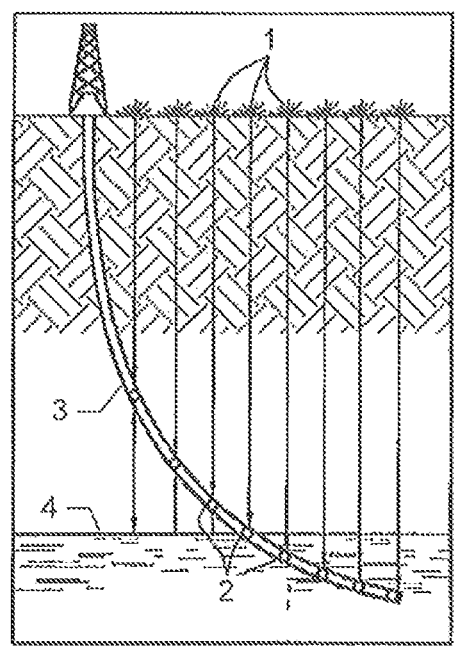

FIGS. 1A-1D show typical seismic-while-drilling tools that include one or more transmitters 1 at the surface and one or more receivers 2 in a borehole 3. FIGS. 1A and 1B show that the down-hole tool may include a single receiver 2 in the borehole 3. Additionally, FIGS. 1A and 1C show that a single transmitter 1 may be implemented as a single seismic (e.g., signal) source, while FIGS. 1B and 1D show a plurality of transmitters 1 providing respective seismic sources. FIG. 1B shows the receiver 2 receiving reflections and direct signals from the transmitters 1, while FIGS. 1C and 1D show multiple receivers 2 receiving signals directly from the one or more transmitters 1.

Seismic images may be generated from the arrangement of the transmitter(s) 1 and the receiver(s) 2 of FIGS. 1A-1D. FIG. 1A shows a reflection of the signal off a rock boundary layer or a bed boundary 4. The seismic imaging of the bed boundary generates a zero-offset vertical seismic profile arrangement. FIG. 1B shows a reflection of the signals off the bed boundary 4. This seismic imaging generates a walkway vertical seismic profile arrangement. FIG. 1C shows a refraction through salt dome boundaries. This seismic imaging generates a salt proximity vertical seismic profile. FIG. 1D includes signal reflections off the rock layer boundary 4 and/or some direct signals from the transmitter 1. This seismic imaging generates a walkaway vertical seismic profile. The vertical profiles and/or arrangements referred to in FIGS. 1A-1D are labeled vertical because the receiver(s) 2 are oriented vertically along the borehole 3.

Furthermore, each receiver(s) 2 may include sensors evenly spaced around the circumference of the receiver. To determine the distance from the tool in the borehole 3 to a first portion of the boundary 4 of a rock layer, the transmitter(s) 1 transmit a first signal. This first signal propagates in all directions through the rock layer. When the signal reaches the boundary 4 of the rock layer, the signal reflects back to the borehole 3. The receiver(s) 2 may then detect the reflected signal. Similarly, a second signal may be transmitted by the transmitter(s) 1 and received by the receiver(s) 2 after reflecting off the boundary 4.

The distance to the boundary 4 can be related to the time for the first signal to reach each receiver 2, the distance from each of the receiver(s) 2 to the transmitter 1, and the velocity of the first signal. There may be a separate time-distance relationship for each sensor within the receiver 2 that receives the reflected first signal. Similarly, the time for the second signal to reach each of the receivers 2, the distance from the receivers 2 to the transmitter(s) 1, and the velocity of the signal can be related to the distance to the boundary 4. These relationships may then be combined into a semblance model to calculate the distance to a portion of the boundary 4.

Figure 2:
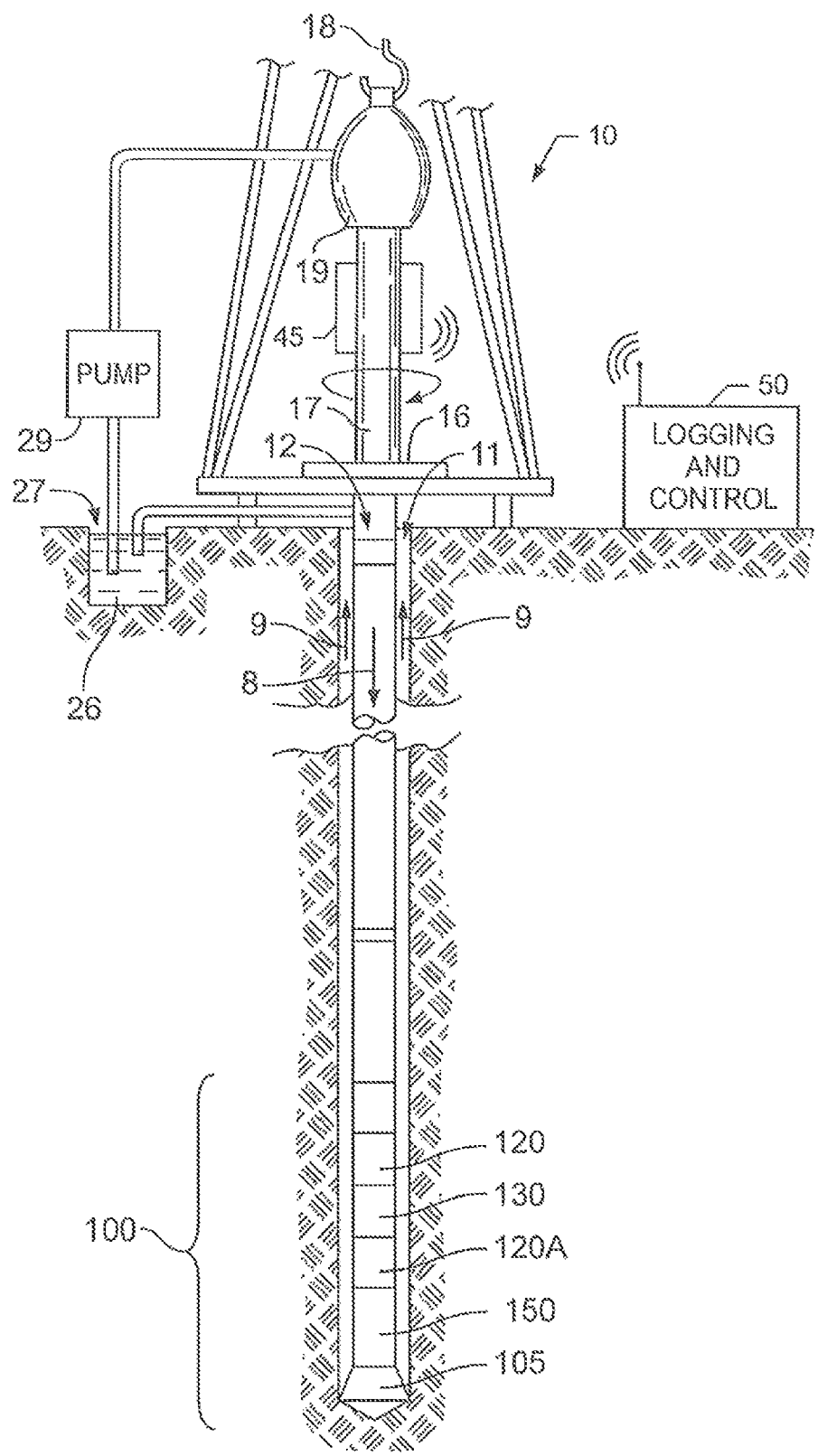
FIG. 2 is a schematic illustration of a wellsite system according to embodiments of the disclosure.

FIG. 2 illustrates a wellsite system in which the present examples can be employed. The wellsite can be onshore or offshore. In this exemplary system, a borehole 11 is formed in subsurface formations by rotary drilling in a manner that is well known. The examples described herein may also use directional drilling, as will be described hereinafter.

A drill string 12 is suspended within the borehole 11 and has a bottom-hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from the hook 18, attached to a traveling block (also not shown), through the kelly 17 and the rotary swivel 19 which permits rotation of the drill string 12 relative to the hook 18. As is well known, a top drive system could alternatively be used.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. The drilling fluid lubricates the drill bit 105 and carries formation cuttings up to the surface as it is returned to the pit 27 for recirculation.

Additionally, the wellsite system includes a communications relay 45 and a logging and control processor 50. The example communications relay 45 may receive information and/or data from sensors, transmitters and/or receivers located within the bottom-hole assembly 100. The information may be received by the communications relay 45 via a wired communication path through the drill string 12 and/or via a wireless communication path. The communications relay 45 transmits the received information and/or data to the logging and control processor 50. Additionally, the communications relay 45 may receive data and/or information from the logging control processor 50. Upon receiving the data and/or information, the communications relay 45 may forward the data and/or information to the appropriate sensor(s), transmitter(s) and/or receiver(s) within the bottom-hole assembly 100.

The example logging and control processor 50 may include a user interface that enables parameters to be input and/or outputs to be displayed. Additionally, the logging and control processor 50 may control imaging of a fractures or caves (e.g., karst caves) in a subterranean formation. For example, the logging and control processor 50 may position the bottom-hole assembly 100 and/or a sonic and/or seismic imaging tool within the borehole 11, instruct transmitters to transmit a signal for receivers and/or sensors to receive.

Additionally, the logging and control processor 50 may calculate a distance from the borehole 11 to a portion of a fracture and/or cave (e.g., an S-S reflection point) based on the transmitted and received signal. While the logging and control processor 50 is depicted up-hole at the surface and within the wellsite system, a portion or the entire logging and control processor 50 may be positioned in the bottom-hole assembly 100 and/or in a remote location. The logging and control processor 50 is described in greater detail in conjunction with FIG. 9.

The bottom-hole assembly 100 of the illustrated example includes a logging-while-drilling (LWD) module 120, a measuring-while-drilling (MWD) module 130, a roto-steerable system and motor 150, and drill bit 105.

The LWD module 120 is housed in a special type of drill collar and can contain one or a plurality of logging tools. Further, more than one LWD and/or MWD module can be employed, e.g. as represented at 120A. (References, throughout, to a module at the position of 120 can alternatively mean a module at the position of 120A as well). The LWD module 120 includes capabilities for measuring, processing, and storing information, as well as for communicating with the surface equipment. In this example, the LWD module 120 includes both pressure and sonic measuring devices.

MWD module 130 is also housed in a special type of drill collar and can contain one or more devices for measuring characteristics of the drill string and drill bit. The MWD tool 130 further includes an apparatus (not shown) for generating electrical power to the down-hole system. This may typically include a mud turbine generator powered by the flow of the drilling fluid, it being understood that other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

One use of the system hereof is in conjunction with controlled steering or directional drilling. In this example, a roto-steerable subsystem 150 (FIG. 2) is provided. Directional drilling is the intentional deviation of the wellbore from the path it would naturally take. In other words, directional drilling is the steering of the drill string so that it travels in a desired direction. Directional drilling is, for example, useful in offshore drilling because it enables many wells to be drilled from a single platform. Directional drilling also enables horizontal drilling through a reservoir or cave. Horizontal drilling enables a longer length of the wellbore to traverse the reservoir, which increases the production rate from the well.

A directional drilling system may also be used in vertical drilling operations as well. Often, the drill bit will veer off of a planned drilling trajectory because of the unpredictable nature of the formations being penetrated or the varying forces that the drill bit experiences or the geology may not be where it is expected to be. When such a deviation occurs, a directional drilling system may be used to put the drill bit back on course.

Figure 3:
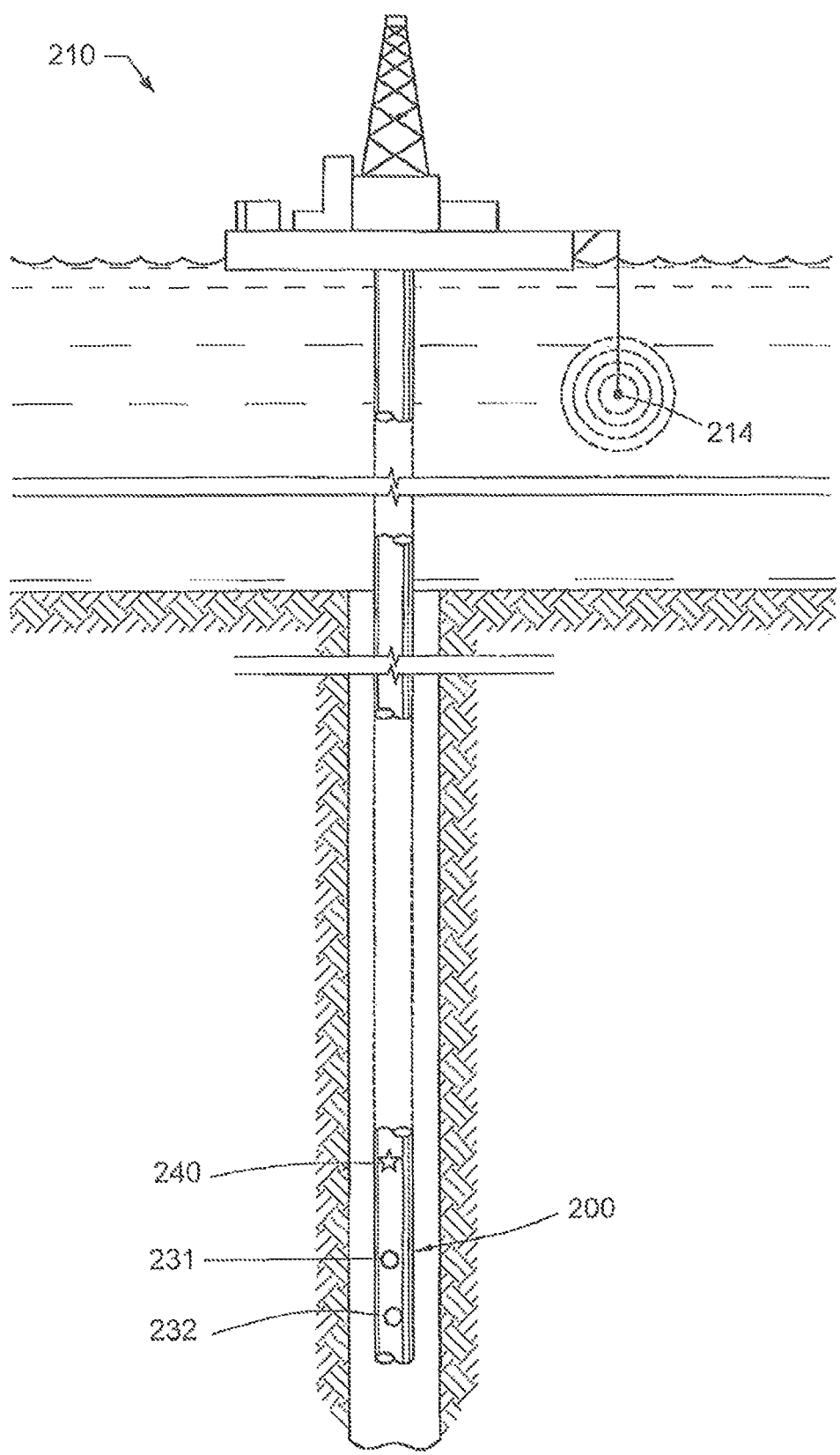
FIG. 3 is a schematic illustration of a sonic logging-while-drilling tool in the wellsite system.

FIG. 3 illustrates a seismic logging-while-drilling tool which can be the LWD tool 120, or can be a part of an LWD tool suite 120A of the type described in U.S. Pat. No. 6,308,137, incorporated herein by reference in its entirety. In the example shown in FIG. 3, an offshore rig 210 is employed, and a seismic transmitting source or array 214 is deployed near the surface of the water. Alternatively, any other suitable type of up-hole or down-hole source or transmitter can be provided. An up-hole processor controls the firing of the transmitter 214. The up-hole equipment can also include acoustic receivers and a recorder for capturing reference signals near the source. The up-hole equipment further includes telemetry equipment for receiving MWD signals from the down-hole equipment.

The telemetry equipment and the recorder are typically coupled to a processor so that recordings may be synchronized using up-hole and down-hole clocks. The down-hole LWD module 200 includes at least acoustic receivers 231 and 232, which are coupled to a signal processor so that recordings may be made of signals detected by the receivers in synchronization with the firing of the signal source. Alternatively, a down-hole acoustic source 240 can be provided as is further described herein.

Figure 4:
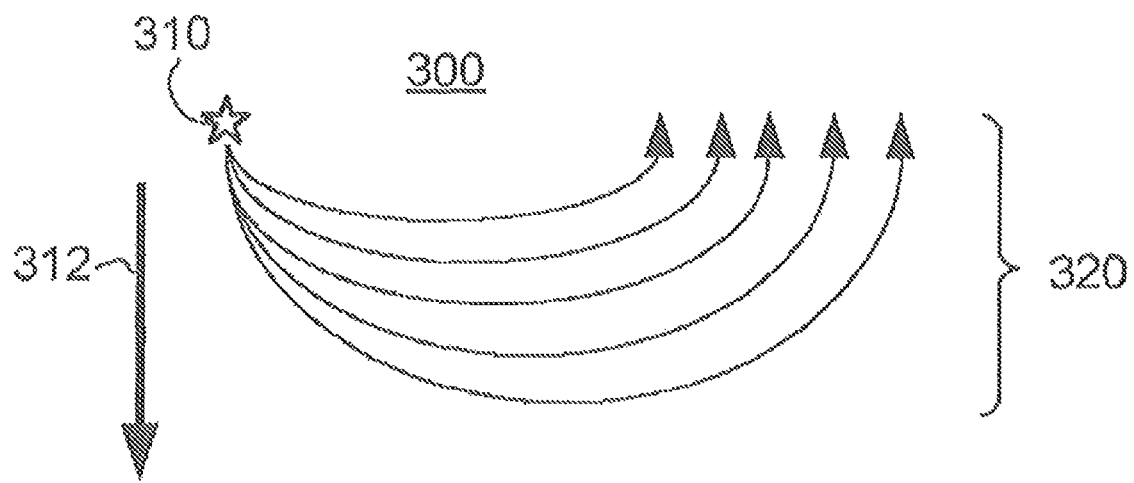
FIG. 4 illustrates the mechanism of refraction in a gradually changing medium.

Energy waves can be returned back towards a tool or other source though the mechanism of refraction. FIG. 4 illustrates the mechanism of refraction in a gradually changing medium. Medium 300 has a gradually and continuously increasing velocity profile in the direction of arrow 312. Acoustic source 310 emits acoustic energy along ray paths 320. Because the medium velocity is gradually increasing, the ray paths are curved as shown in FIG. 4. However, in many down-hole situations the velocity profile is not gradually increasing but, rather there is a distinct interface.

Figure 5:
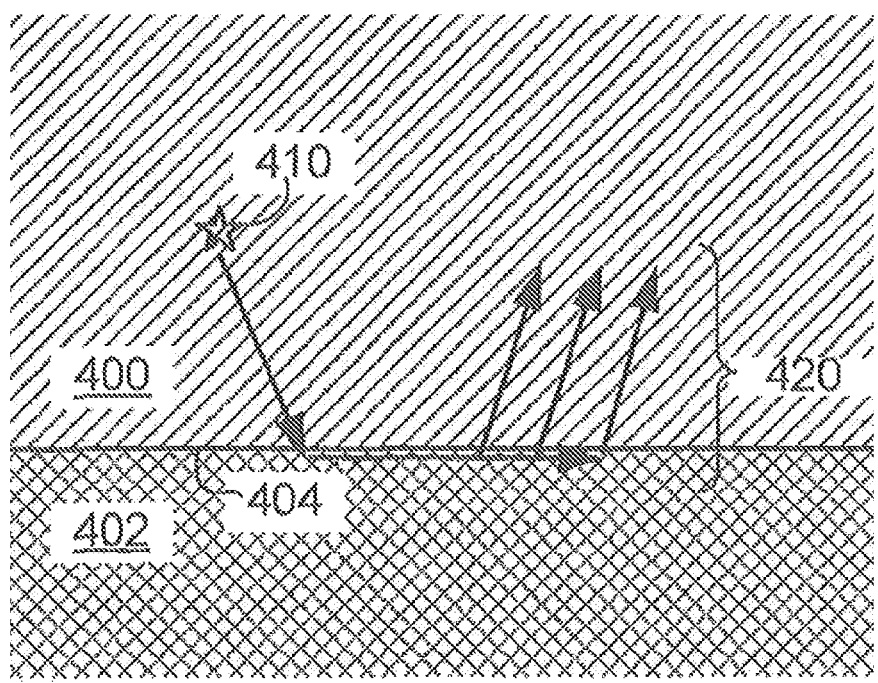
FIG. 5 illustrates the mechanism of refraction in the case of a nearby interface.

FIG. 5 illustrates the mechanism of refraction in the case of a nearby interface. Medium 400 has lower velocity than medium 402, the two media being separated by an interface 404. Due to the interface 404, energy from source 410 travels along the interface 404 in the form of head waves, as shown by ray paths 420. Thus, where a well sits in the lower velocity medium and a higher velocity medium lies very nearby, this model of refracted energy can be used to analyze the data.

FIG. 6A illustrates the down-hole measurement of refracted energy by a tool in a borehole. Borehole 540 lies entirely within subterranean rock formation 500 having a first propagation velocity $v_1$. A nearby rock formation 502 has a propagation velocity $v_2$ and is separated from formation 500 by interface 504. Furthermore, in this example, $v_2 > v_1$. Tool 530 lies within borehole 540. The tool 530 can be a wireline deployed tool, or it can be deployed via different means such as via coiled tubing, or on a drill collar during a drilling operation.

Acoustic source 510 is disposed on tool 530 as shown and generates acoustic energy. The acoustic energy travels along several ray paths corresponding to different propagation modes. The tool mode propagates along the body of the tool as shown by ray path 524. A compressional head wave propagates along the borehole wall, as shown by ray path 522. The energy refracted by interface 504 travels along through formation 500 towards interface 504, along interface 504 and then back through formation 500 towards a receiver array 532 as shown by ray paths 520.

As shown in FIG. 6A, when another formation with a higher compressional velocity is located close to the borehole, an additional head wave is generated on the interface between the two formations. For receivers close to the source, the head wave on the borehole wall arrives first. However it has been found that at greater source-receiver separations the head wave propagating along the interface between formations is detected first. The arrival time and move out across the array can be analyzed to determine the distance from the borehole to the boundary 504 between the formations.

FIGS. 6B and 6C are example cross-sectional views of the tool shown in FIG. 6A. In FIG. 6B, four receivers 560, 562, 564 and 566 are located at each receiver station, thereby giving azimuthal resolution to the refracted acoustic energy data. FIG. 6C shows an arrangement of eight azimuthally distributed receivers for each receiver station in the array 532 (as shown in FIG. 6A), thereby providing greater azimuthal resolution.

Figure 7A:
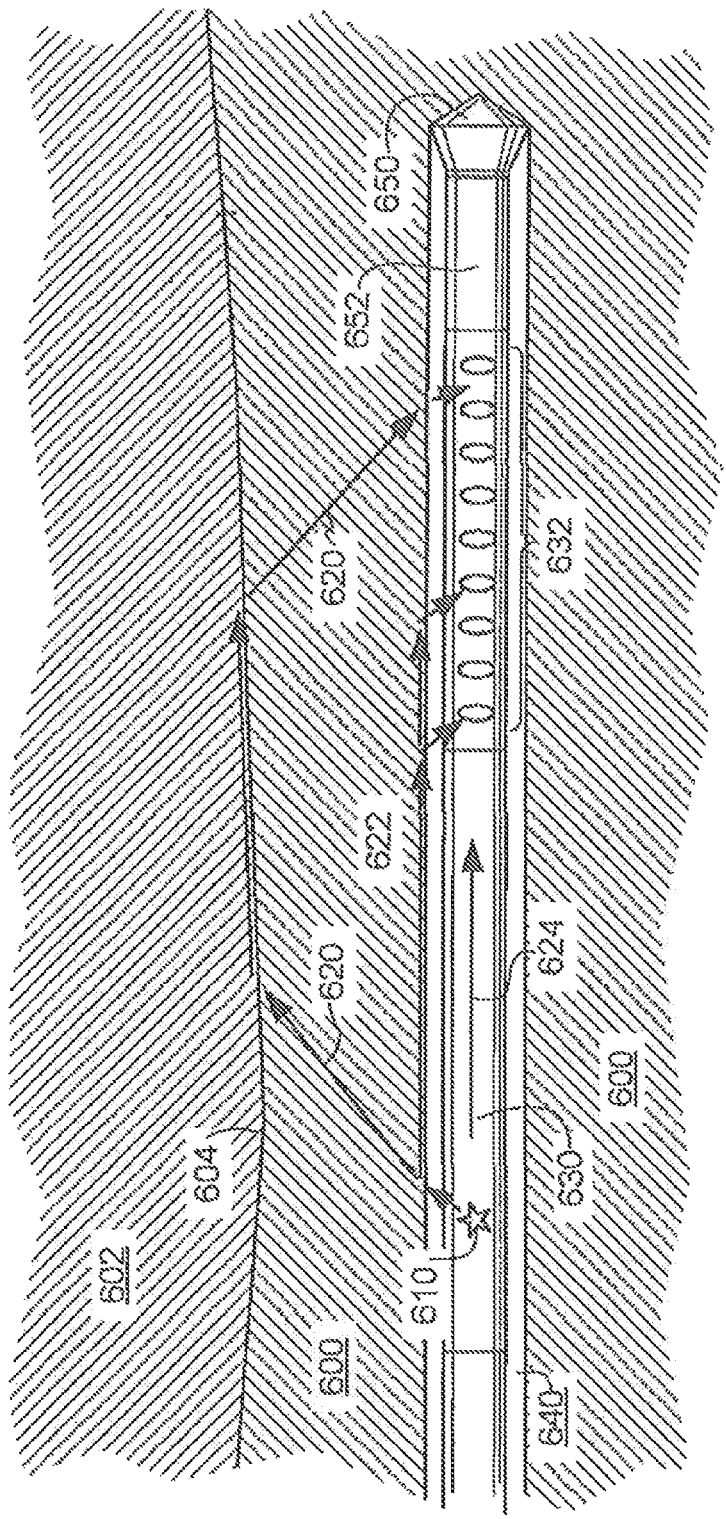
FIG. 7A illustrates the down-hole measurement of refracted energy by a LWD tool in a borehole during a drilling operation.

FIG. 7A illustrates the down-hole measurement of refracted energy by an LWD tool in a borehole during a drilling operation. Borehole 640 lies entirely within subterranean rock formation 600 having a first propagation velocity $v_1$. A nearby rock formation 602 has a propagation velocity $v_2$ and is separated from formation 600 by interface 604. As in the example of FIG. 6A, in this example $v_2 > v_1$. Bottom hole assembly 630 lies within the borehole 640 and includes drill bit 650 and roto-steerable subsystem 652. The roto-steerable subsystem 652 provides directional drilling and geo-steering in response to analysis of the refracted energy measurements. Alternatively, the subsystem 652 could include a mud motor and bent sub to provide directional drilling capability.

Acoustic source 610 is disposed on the assembly 630 as shown and generates acoustic energy. The acoustic energy travels along several ray paths corresponding to different propagation modes. The tool mode propagates along the body of the tool as shown by ray path 624. A compressional head wave propagates along the borehole wall, as shown by ray path 622. The energy refracted by the interface 604 travels along through formation 600 towards the interface 604, along the interface 604 and then back through the formation 600 towards a receiver array 632 as shown by ray paths 620. Although the receiver array 632 is shown closer to the drill bit 650 than the source 610, in an alternative example, the receiver array 632 is positioned farther away from the drill bit 650 than the source 610 to reduce the amount of noise received from the drill bit 650.

Figure 7C:
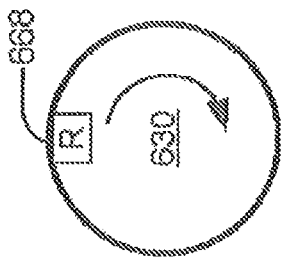
FIGS. 7B and 7C are cross-sectional views of the LWD tool shown in FIG. 7A.
Figure 7B:
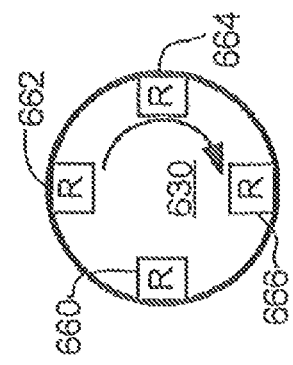

FIGS. 7B and 7C are examples of cross-sections of the LWD tool shown in FIG. 7A. In FIG. 7B, four receivers 660, 662, 664 and 666 are located at each receiver station, thereby giving azimuthal resolution to the refracted acoustic energy data. However, due to the rotation of the drill collar during a drilling operation, additional azimuthal resolution can be obtained by making measurements while the collar is rotated to different positions. For example, FIG. 7C shows an arrangement including only a single receiver for each receiver station. Azimuthal resolution is provided by making measurements at different rotational positions of the drill collar.

As described above, to image subsurface structures using seismic data, Kirchhoff migration is commonly used and it is well known that the aperture of migration needs to be optimized to obtain high resolution images of the subsurface structures. To obtain high-resolution images of subsurface structures without having dip information, a migration method for scattering waves to image core-mantle structures that uses cross-correlation and semblance is developed.

In the present disclosure herein, the migration method is improved to image fractures. The present methods and systems in the disclosure herein are capable of automatically estimating one or more structural dips from the seismic array data and mapping event signals in the space. The present methods and system in the disclosure herein can be viewed as improved versions of the Matched Field Processing (MFP) described in the Baggeroer, A. H., W. A. Kuperman, and P. N. Mikhalevsky, 1993, "An overview of matched field methods in ocean acoustics": IEEE Journal of Ocean Engineering, 18, pp. 99-108, the entire contents of which is hereby incorporated by reference herein. The Matched Field Processing (MFP) proposed by Baggeroer, et al. searches for event locations, whereas the present methods and systems in the disclosure herein search for one or more real reflectors by using trial reflector as described hereinafter.

Figure 8:
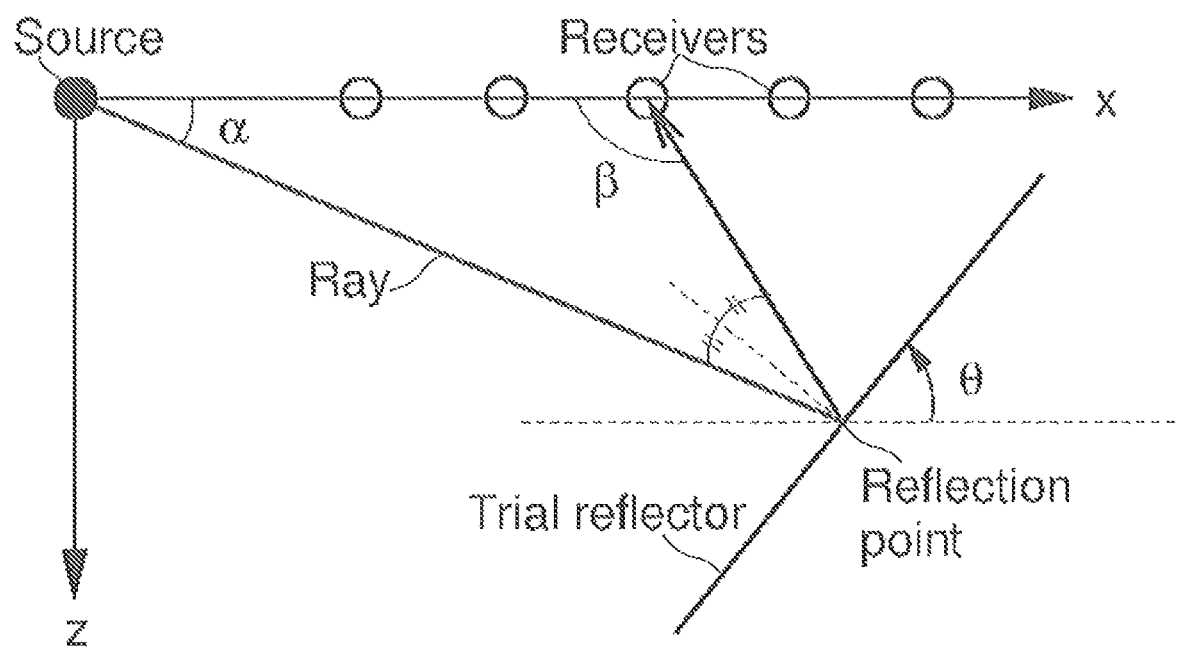
FIG. 8 illustrates an example of trial reflector.

[Trial reflector] FIG. 8 illustrates an example of trial reflector. Here, the trial reflector is assumed to be defined for the common shot gather. The trial reflectors are used to find real geologic reflectors and compute weights for waveform samples. For an image point and a source-receiver pair, a trial reflector is defined as follows. Let $x_s$ and $x_r$ be the source and receiver positions, respectively, and x is the image point. A planar reflector is defined so that the iso-chronal vector of rays from $x_s$ and $x_r$ to x is perpendicular to the reflector at x. The isochronal vector $p_{sr}(x)$ is computed as:

$$p_{sr}(x)=p_s(x)+p_r(x), \quad (1)$$

where $p_s(x)$ and $p_r(x)$ are the slowness vectors of rays from $x_s$ and $x_r$ to x, respectively. Equation (1) can be also used for the mode converted transmitted waves and travel times of transmitted rays are used. The trial reflector is explicitly expressed by:

$$p_{sr}(x) \cdot (x_0-x)=0, \quad (2)$$

where $x_0$ is a point on the reflector. For anisotropic formation, the trial reflector is defined in a similar fashion such that the reflection happens at x for rays from $x_s$ and $x_r$.

[Measure of coherency and weight function] To measure coherency of two event signals, cross-correlation is used. The cross-correlation of two waveform traces is given by:

$$F_{jk}^i(t_{ij}, t_{ik}) = \frac{\int_{-T_p}^{T_p} f_{ij}(t_{ij}+\tau)f_{ik}(t_{ik}+\tau)d\tau}{\left[\int_{-T_p}^{T_p} f_{ij}^2(t_{ij}+\tau)d\tau \int_{-T_p}^{T_p} f_{ik}^2(t_{ik}+\tau)d\tau\right]^{1/2}}, \quad (3)$$

where i is the index of source, j and k are indices of receivers, $t_{ij}$ and $t_{ik}$ are the reference times, $f_{ij}(t)$ and $f_{ik}(t)$ are the waveform traces and $T_p$ is the dominant period of event signals. Here, the waveform traces are assumed to be deconvolved or time shifted so that the center of event signal is at the travel time.

The coherency measure over traces for the trial reflector is estimated by taking the minimum of $F_{jk}^i(t_{ij},t_{ik})$ as:

$$C_{ij}(x) = \min_{k(k \neq j)} F_{jk}^i(t_{ij}^R(i,j;x), t_{ik}^R(i,j;x)), \quad (4)$$

where $t_{ij}^R(i,j;x)$ and $t_{ik}^R(i,j;x)$ are the travel times of reflected rays for the i-th source and j-the and k-th receivers, respectively, for the trial reflector defined for the i-th source, j-th receiver and image point x. It is noted that the minimum in Equation (4) can be replaced by the median and average functions to optimize the image depending on quality of event signals. The coherency $C_{ij}(x)$ is converted to a weight function by using:

$$w_{ij}(x) = \begin{cases} \left\{1+\left(\frac{1-C_{ij}(x)}{1-C_L}\right)^6\right\}^{-1} & \text{(for } C_{ij}(x) > 0\text{),} \\ 0 & \text{(for } C_{ij}(x) \leq 0\text{),} \end{cases} \quad (5)$$

where $C_L$ is the cut-off value of cross-correlation, which is typically 0.6.

[Mapping of waveform samples] In this mapping, the common shot gather is considered to measure the coherency for ease of explanation. It is noted that the present method can be used also for the common receiver gather and any subset of traces. Three options of mapping functions can be used. The mapping function is defined as:

$$M(x) = \sum_i \left\{\sum_j h_{ij}(x)\right\}, \quad (6)$$

where x is an image point, M(x) is the image at x, i and j are indices of source and receiver, respectively, $w_{ij}(x)$ is weight function, which is computed by the foregoing Equation (5), and $h_{ij}(x)$ is the function of waveform samples defined below.

The simplest implementation of $h_{ij}(x)$ is $$h_{ij}(x)=w_{ij}(x)w_{ij}^M(x)g_{ij}^D(x)f_{ij}(t_{ij}^D(x)), \quad (7)$$

where $f_{ij}(t)$ is the waveform trace, $t_{ij}^D(x)$ and $g_{ij}^D(x)$ are the travel times and geometrical spreading of diffracted ray at x, respectively, $w_{ij}^M(x)$ is the migration weight. The details of migration weight is found, for example, in Beylkin, G., 1985, "Imaging of discontinuities in the inverse scattering problem by inversion of a causal generalized radon transform": Journal of Mathematical Physics, 26, 99-108.

Another form of $h_{ij}(x)$ is given by combining the CDP (Common Depth Point) stack as $$h_{ij}(x) = \frac{w_{ij}(x)}{N} \sum_k g_{ik}^R(i,j;x) f_{ik}(t_{ik}^R(i,j;x)), \quad (8)$$

where $t_{ij}^R(i,j;x)$ and $g_{ij}^R(i,j;x)$ are the travel times and geometrical spreading of reflected ray for the trial reflector that is defined for the i-th source, j-th receiver and image point x. The details of CDP stack is described in the Schneider, W. A., 1984, "The common depth point stack": Proceedings of the IEEE, 72, 1238-1254, the entire contents of which is hereby incorporated by reference herein.

Another form of $h_{ij}(x)$ is given by smearing the weighted sample within in the Fresnel zone defined for the trial reflector. The smearing method is described in Buske, S., R. Gutjahr, and C. Sick, 2009, "Fresnel volume migration of single-component seismic data": Geophysics, 74, no. 6, WCA47-WCA55.

Figure 9:
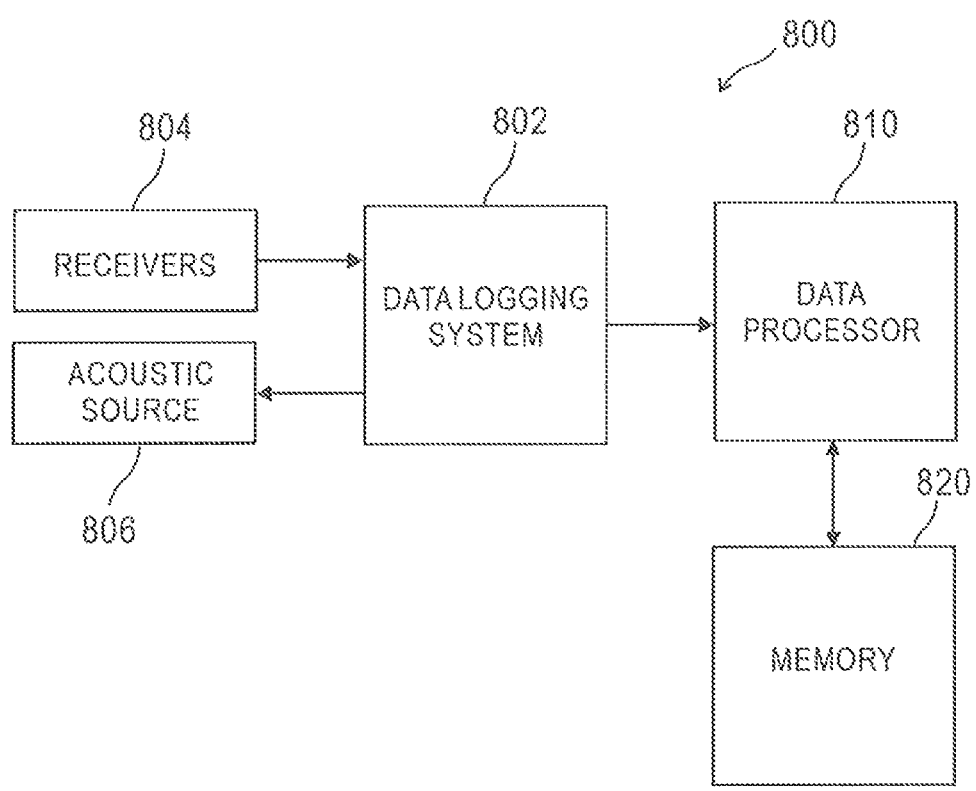
FIG. 9 shows a schematic block diagram showing one example of a system for imaging dipping structures according to embodiments of the disclosure.

Referring to FIG. 9, the system 800 to image dipping structures such as fractures may comprise a data logging system 802, acoustic receivers (vibration sensors) 804 located in the wellbore, an acoustic source 806 of generating vibrations to be received with the receivers 804, a data processor 810 such as a computer apparatus, and a memory 820.

For example, the data logging system 802 may comprise one or more modules in the foregoing tool and tubing/cable. The receivers 804 such as the down-hole array of multiple receivers or the DVS (distributed vibration sensing) may be installed in the foregoing tool and coupled with the data logging system 802 via the tubing/cable. The acoustic source 806 such as the foregoing one or more sources may be coupled with the data logging system 802 so that the generation of vibrations can be controlled.

The acoustic waves detected with the receivers 804 may be transmitted to the data logging system 802 via the tubing/cable and the data logging system 802 may produce a data log of acoustic waves (vibrations) received at the receivers 804. The data processor 810 may be coupled with the data logging system 802 via a cable or a network so as to receive the data log from the data logging system 802. The data processor 810 may be implemented by one or more circuit(s), programmable processor(s), application specific integrated circuit(s) (ASIC(s)), programmable logic device(s) (PLD(s)) and/or field programmable logic device(s) (FPLD(s)), etc.

The data log may be transferred from the data logging system 802 to the data processor 810 via a storage medium such as a USB memory, a memory card, a magnetic tape or disk, an optical disk, etc. The data processor 810 may be also installed within the data logging system 802. The sonic data such as waveforms are temporarily or permanently stored in the memory 820 which is a tangible computer readable medium such as a memory, digital versatile disk (DVD), compact disk (CD), etc. Software and/or firmware including instructions for processing the sonic data are also stored in the memory.

Figure 10:
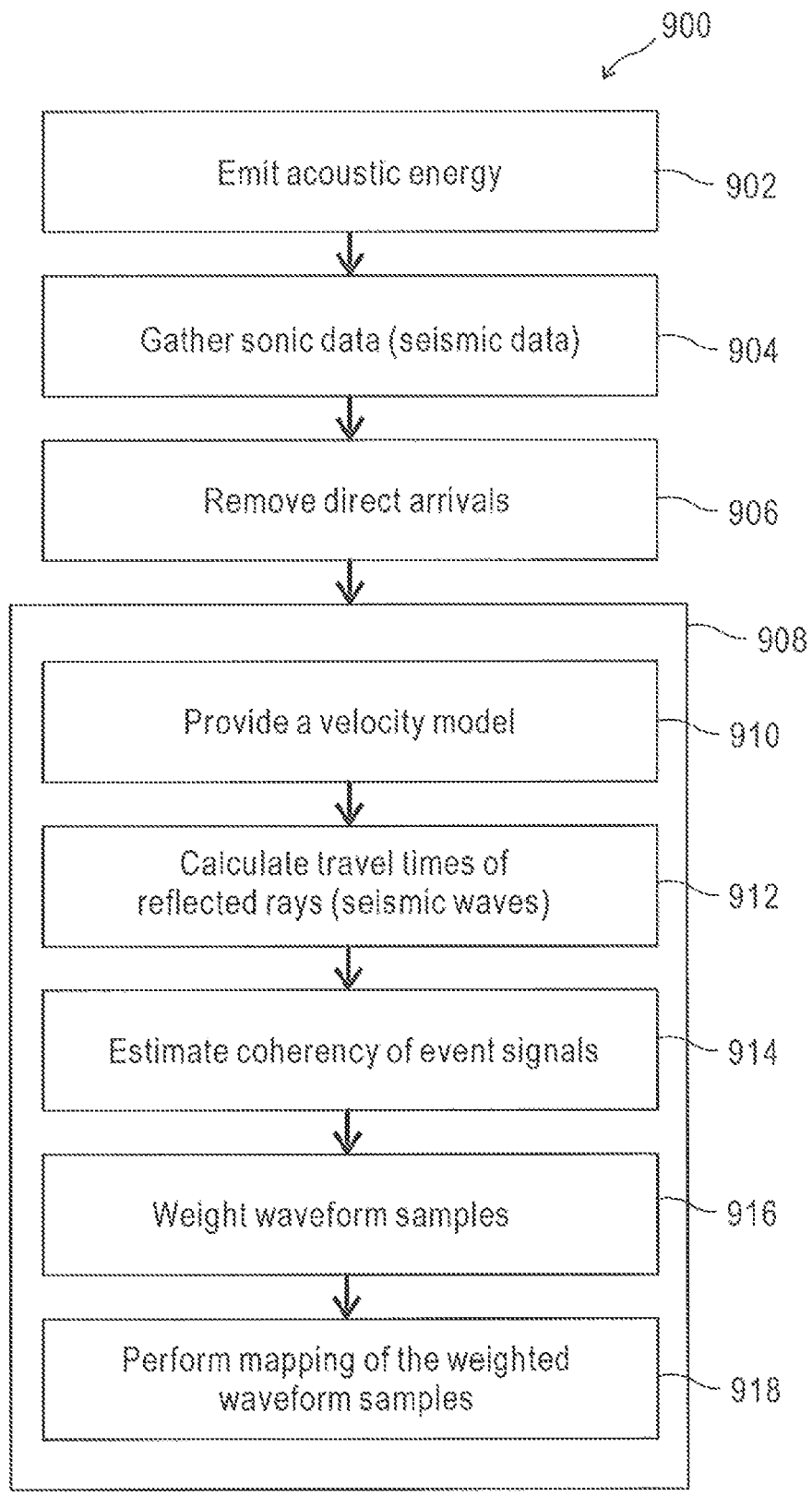
FIG. 10 is a flowchart showing one example of imaging dipping structures using sonic data (seismic data) according to the disclosure herein.

FIG. 10 shows a flowchart showing one example of imaging dipping structures such as fractures using sonic data (seismic data) according to the disclosure herein. The imaging of near borehole structures has been investigated since 1989 as described in the document of Hornby, B. E., 1989, "Imaging of near-borehole structure using full-waveform sonic data": Geophysics, 54, pp. 747-757. As a monopole source emits strong shear waves near parallel to the borehole as described in the document of, for example, Myung, W. L., and A. H. Balch, 1982, "Theoretical seismic wave radiation from a fluid-filled borehole": Geophysics, 47, pp. 1308-1314, and the reflectivity of shear waves to fractures is significant as described in the document of Schoenberg, M., 1980, "Elastic wave behavior across linear slip interface": Journal of Acoustic Society of America, 68, pp. 1516-1521, the strong shear-reflected-share waves are observed when the fractures are near perpendicular to the well. It is noted that the entire contents of aforementioned documents are hereby incorporated by reference herein.

Figure 11:
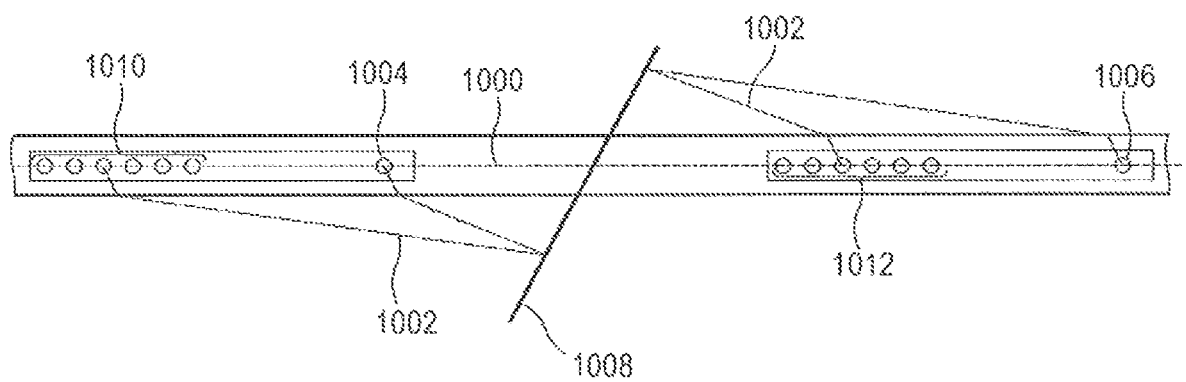
FIG. 11 is a schematic illustration of a reflected ray from a fracture.

In FIG. 10, with reference to the preceding figures and associated descriptions and FIG. 11, the processing 900 begins execution at block 902, at which the system 800 emits acoustic energy, for example, in the form of acoustic waveforms (rays) 1002 by acoustic sources 1004, 1006 of a sonic tool 1000 (refer to FIG. 11) or the transmitters 510, 610 described above.

At block 904, after the waveforms (rays) 1002 are reflected off of portions of the subterranean formation including, for example, portions of one or more dipping structure(s) such as fracture(s) 1008 in FIG. 11, the system 800 gathers sonic data (seismic data) from the reflected waveforms (rays) 1002 by acoustic receivers 1010, 1012 in the sonic tool 1000 or the receivers 560, 562, 564, 566, 660, 662, 664, 666, 668 described above and sent to, for example, an input receiver of the data logging system 802 and data processor 810 for recordation and processing. The sonic data is recorded by the sonic tool 1000 that has, for example, 8 azimuthal arrays of 13 receivers at 45-degree intervals. The minimum distance between the source and receiver may be approximately 2.13 m (7 ft) and the receivers may be located at 15.24 cm (0.5 ft) intervals. A monopole source of 8 kHz central frequency may be used for the data acquisition.

At block 906, before the imaging, the system 800 removes the direct arrivals (i.e., P-, S- and Stoneley waves) by the median filter in the common offset domain (i.e., waveforms acquired by unique receiver are sorted by the measurement depth).

At block 908, the system 800 executes data processing for imaging the dipping structures such as fractures, as discussed elsewhere herein. At sub-block 910 in this data processing, the system 800 provides a given constant velocity model with static corrections for a single acquisition point, and at sub-block 912, the system 800 analytically calculates travel times of reflected rays (e.g., seismic waves) using the velocity model. At sub-block 914, the system 800 estimates coherency of event signals that are time-corrected for a trial reflector, and at sub-block 916, the system 800 weights waveform (ray) samples corresponding to the travel time based on the coherency.

The weighting can be performed, for example, by converting the coherency to a weight function and calculating a mapping function based on the weight function and a function of the waveform samples. Finally, at sub-block 918, the system 800 performs mapping of the weighted waveform samples. The image may be created azimuth by azimuth at first as described in the document of Haldorsen, J. B. U., Z. Fuping, N. Hirabayashi, W. H. Borland, H. Karniawan, H. Yamamoto, K. Al-Ghammari, and R. T. Coates, 2010, "Borehole acoustic reflection survey (bars) using full waveform sonic data": First Break, 28, pp. 33-38, the entire contents of which is hereby incorporated by reference herein.

Figure 12A:
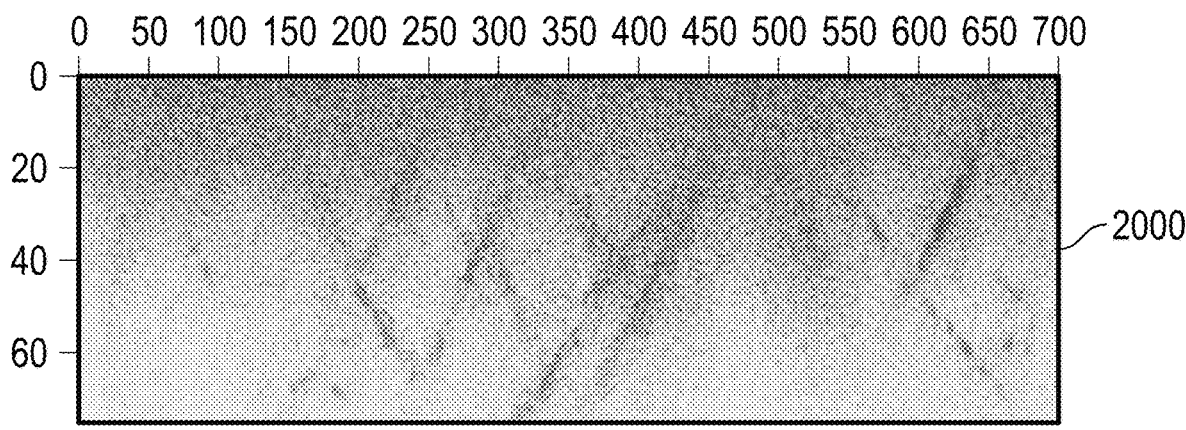
FIG. 12A shows an example of image obtained by the conventional Kirchhoff migration.
Figure 12B:
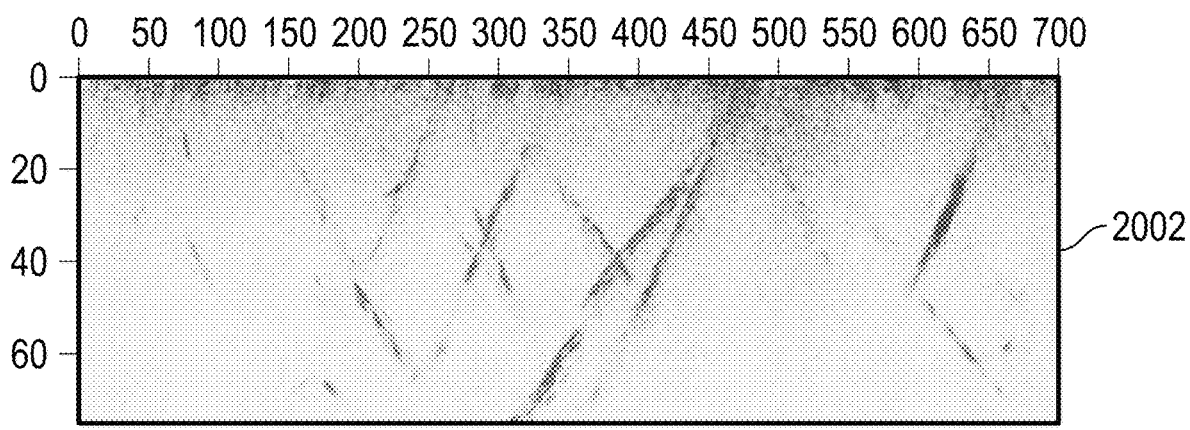
FIGS. 12B and 12C show examples of images obtained by the improved method with the simple implementation and the CDP stack, respectively, according to embodiments of the disclosure.
Figure 12C:
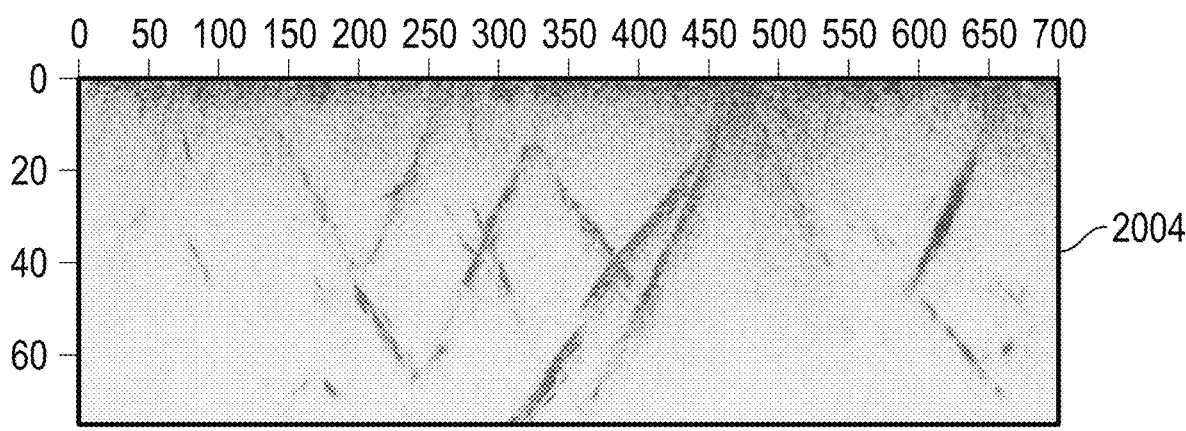

FIG. 12A shows a comparative example of a migration image 2000 obtained by the conventional Kirchhoff migration, and FIGS. 12B and 12C show examples of migration images 2002 and 2004 obtained by the present improved method according to embodiments of the disclosure. The image 2002 in FIG. 12B is obtained by the present method with a simple implementation expressed by the foregoing Equation (7) and the image 2004 in FIG. 12B is obtained by the present method with the CDP stack expressed by the foregoing Equation (8). The examples shown herein are migration images for a single azimuth of the tool. The figures show the up and down-side of fractures in the R-Z space as their signals are contained in the waveform traces of single receiver array. Therefore, azimuthal analyses (refer to, for example, the foregoing document by Haldorsen et al.) are necessary to select the correct dip directions (up or down) and azimuths. However, this process is omitted here. According to the result of imaging the fractures in FIGS. 12A-12C, it is found that the images 2002 and 2004 obtained by the present method in FIGS. 12B and 12C show higher resolution for fractures than the image 2000 obtained by the conventional method in FIG. 12A.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method for imaging one or more dipping structures in a subterranean formation, the method comprising:
- emitting acoustic energy in the form of acoustic waveforms in a borehole penetrating the subterranean formation;
- receiving the acoustic waveforms reflected off the one or more dipping structures, wherein the received acoustic waveforms are in the form of array data comprising event signals;
- providing a given velocity model;
- calculating a travel time for each of the received acoustic waveforms with reference to a trial reflector using the velocity model;
- estimating coherency of the event signals with reference to the trial reflector using time-correction for the travel time;
- weighting each of the received acoustic waveforms reflected off the one or more dipping structures based on the coherency; and
- mapping each of the weighted waveforms.

2. The method according to claim 1, wherein the trial reflector is configured for each image point and source-receiver pair so that a reflected ray becomes specular for the trial reflector at the image point.

3. The method according to claim 1, wherein the trial reflector is a planar reflector configured so that an isochronal vector of ray from a source and a receiver to an image point is perpendicular to the trial reflector at the image point.

4. The method according to claim 1, wherein the coherency is estimated based on cross-correlation of waveform traces of the event signals.

5. The method according to claim 1, wherein the coherency is estimated based on a function of amplitude-normalized waveform traces of the event signals.

6. The method according to claim 1, wherein the coherency is computed by taking a minimum or median or average of cross-correlations in array data.

7. The method according to claim 1, wherein the weighting comprises:
- converting the coherency to a weight function; and
- calculating a mapping function based on the weight function and a function of the acoustic waveforms.

8. The method according to claim 1, further comprising stacking the acoustic waveforms on the trial reflector.

9. The method according to claim 1, further comprising removing a direct arrival from each of the received acoustic waveforms before calculating the travel time of each of the received acoustic waveforms.

10. The method according to claim 1, wherein the one or more dipping structures comprises a fracture.

11. A system for imaging one or more dipping structures in a subterranean formation, the system comprising:
- a data logging system;
- acoustic receivers;
- an acoustic source to generate waveforms to be received by the acoustic receivers;
- a memory to store waveforms received by the acoustic receivers;
- a data processor that is configured to perform functions comprising:
  - emitting acoustic energy in the form of acoustic waveforms in a borehole penetrating the subterranean formation;
  - receiving the acoustic waveforms reflected off the one or more dipping structures, wherein the received acoustic waveforms are in the form of array data comprising event signals;
  - providing a given velocity model;
  - calculating a travel time for each of the received acoustic waveforms with reference to a trial reflector, using the velocity model;
  - estimating coherency of the event signals with reference to the trial reflector, using time-correction for the travel time;
  - weighting each of the received acoustic waveforms reflected off the one or more dipping structures based on the coherency; and
  - mapping each of the weighted waveforms.

12. The system according to claim 11, wherein the trial reflector is configured for each image point and source-receiver pair so that a reflected ray becomes specular for the trial reflector at the image point.

13. The system according to claim 11, wherein the trial reflector is a planar reflector configured so that an isochronal vector of ray from the acoustic source and one of the acoustic receivers to an image point is perpendicular to the trial reflector at the image point.

14. The system according to claim 11, wherein the coherency is estimated based on cross-correlation of waveform of the event signals.

15. The system according to claim 11, wherein the coherency is estimated based on a function of amplitude-normalized waveform of the event signals.

16. The system according to claim 11, wherein the coherency is averaged in a common shot gather.

17. The system according to claim 11, wherein the weighting comprises:
- converting the coherency to a weight function; and
- calculating a mapping function based on the weight function and a function of the received acoustic waveforms.

18. The system according to claim 11, wherein the data processor is further used to stack the received acoustic waveforms on the trial reflector.

19. The system according to claim 11, wherein the data processor is further used to remove a direct arrival from the acoustic waveforms before calculating the travel time of the acoustic waveforms.

20. The system according to claim 11, wherein the one or more dipping structures comprises a fracture.

* * * * *